United States Patent
Lozano et al.

(10) Patent No.: US 11,230,394 B2
(45) Date of Patent: Jan. 25, 2022

(54) STAGING OF ION PROPULSION THRUSTERS

(71) Applicant: Massachusetts Institute of Technology, Cambridge, MA (US)

(72) Inventors: Paulo C. Lozano, Arlington, MA (US); David Krejci, Vienna (AT); Oliver Jia-Richards, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 35 days.

(21) Appl. No.: 16/587,821

(22) Filed: Sep. 30, 2019

(65) Prior Publication Data

US 2020/0102100 A1    Apr. 2, 2020

Related U.S. Application Data

(60) Provisional application No. 62/739,409, filed on Oct. 1, 2018.

(51) Int. Cl.
*B64G 1/40* (2006.01)
*B64G 1/64* (2006.01)
*F03H 1/00* (2006.01)

(52) U.S. Cl.
CPC .............. *B64G 1/405* (2013.01); *B64G 1/64* (2013.01); *F03H 1/0018* (2013.01)

(58) Field of Classification Search
CPC ...... F03H 1/0012; F03H 1/0018; F03H 1/005; B64G 1/402; B64G 1/428; B64G 1/64; B64G 1/645; B64G 1/405; F02K 9/76; F02K 9/763; F02K 9/766

See application file for complete search history.

(56) References Cited

U.S. PATENT DOCUMENTS

| | | | |
|---|---|---|---|
| 3,907,225 A | 9/1975 | Welther | |
| 5,947,421 A | 9/1999 | Beattie et al. | |
| 6,145,298 A | 11/2000 | Burton | |
| 6,518,693 B1 | 2/2003 | Meyer et al. | |
| 2012/0144796 A1* | 6/2012 | Marrese-Reading | F03H 1/0031 60/202 |
| 2015/0083865 A1* | 3/2015 | Nakasone | B64G 1/428 244/158.6 |
| 2015/0128560 A1* | 5/2015 | Conversano | F03H 1/0075 60/202 |
| 2018/0072434 A1* | 3/2018 | Novotney | B64G 1/22 |
| 2018/0354659 A1* | 12/2018 | Baldwin | B64G 1/405 |

OTHER PUBLICATIONS

Hiller "Design of a CubeSat Separation Mechanism" (Year: 2017).*
International Search Report and Written Opinion for Application No. PCT/US2019/053784 dated Nov. 25, 2019.

* cited by examiner

*Primary Examiner* — Arun Goyal
*Assistant Examiner* — William L Breazeal
(74) *Attorney, Agent, or Firm* — Wolf, Greenfield & Sacks, P.C.

(57) ABSTRACT

Spacecraft thruster systems are disclosed. In some instances, a spacecraft thruster system may include stacked ion thrusters and/or ion thruster layers. The ion thrusters and/or ion thruster layers may be sequentially activated and jettisoned from the thruster system after use.

8 Claims, 8 Drawing Sheets

STAGING OF ION PROPULSION THRUSTERS

CROSS-REFERENCE TO RELATED APPLICATIONS

This application claims the benefit under 35 U.S.C. § 119(e) of U.S. Provisional Application 62/739,409, filed Oct. 1, 2018, the disclosure of which is herein incorporated by reference in its entirety.

GOVERNMENT LICENSE RIGHTS

This invention was made with Government support under Grant No. 80NSSC18M0045 by NASA Ames Research Center. The Government has certain rights in the invention.

FIELD

Disclosed embodiments are related to systems and methods of staging of ion propulsion thrusters.

BACKGROUND

With the increased utility and complexity of the standardized Cubesat evolving from an early educational demonstration tool to platforms able to perform increasingly complex mission scenarios, a plethora of propulsion concepts and solutions have been developed and tested in space. Recent developments include cold gas thrusters, chemical thruster systems, and a variety of different electric propulsion solutions including electromagnetic concepts and electrostatic systems such as ion engines and Hall thrusters.

SUMMARY

According to one embodiment, a spacecraft thruster system includes a first ion thruster layer, a second ion thruster layer, a propellant source fluidly connected to the first ion thruster layer and the second ion thruster layer, and a voltage source electrically connected to the first ion thruster layer and the second ion thruster layer. At least the first ion thruster layer is selectively detachable from the propellant source and the voltage source. The voltage source applies a voltage differential to the first ion thruster layer to emit ions when the first ion thruster layer is connected to the propellant source and/or the voltage source. The voltage source applies a voltage differential to the second ion thruster layer to emit ions when the first ion thruster is detached from the propellant source and/or the voltage source.

According to another embodiment, a spacecraft thruster system includes a first ion thruster including a first ion thruster layer and a first propellant tank fluidly connected to the first ion thruster layer, a second ion thruster including a second ion thruster layer and a second propellant tank fluidly connected to the second ion thruster layer, and a voltage source electrically connected to the first ion thruster layer and the second ion thruster layer. At least the first ion thruster layer is selectively disconnectable from the voltage source. The voltage source applies a voltage differential to the first ion thruster layer to emit ions when the first ion thruster layer is connected to the voltage source. The voltage source applies a voltage differential to the second ion thruster layer to emit ions when the first ion thruster is disconnected from the voltage source.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
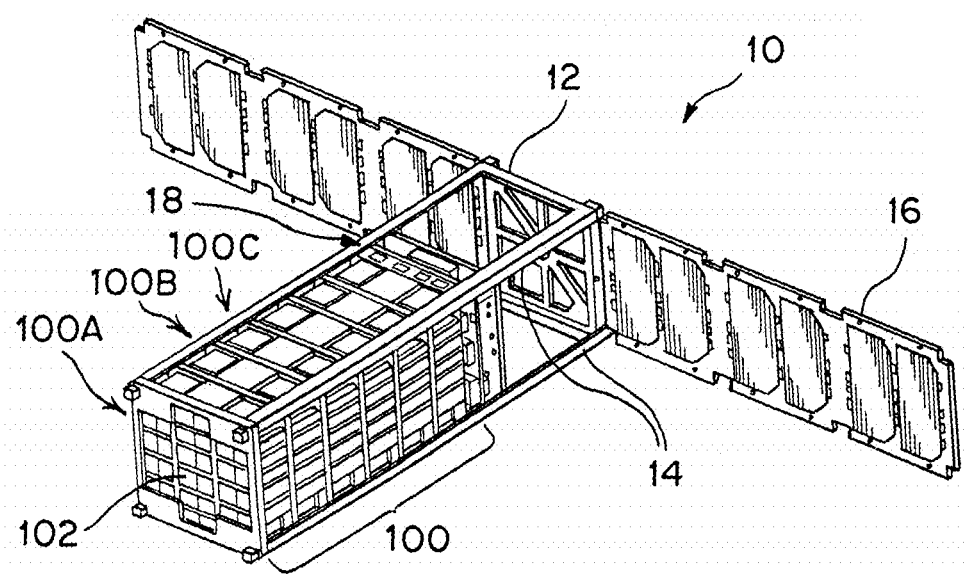
FIG. 1A depicts an embodiment of a spacecraft including staged ion propulsion thrusters.

Traditionally, near Earth objects (NEOs) go unexplored because large and expensive satellites are used on targeted missions which are cost-inhibitive. The exploration of small asteroids making use of miniature spacecraft could provide substantial benefits in terms of affordability, visit rates, and overall science return. Miniaturized high $\Delta v$ propulsion is a desirable technology for performing deep space missions with small satellites. Recent propulsion technologies have been developed to power small satellites, including cold gas thrusters, chemical thruster systems and a variety of different electric propulsion solutions including electromagnetic concepts and electrostatic systems such as ion engines and Hall thrusters. Despite the multitude of propulsion technologies, most of them are difficult to miniaturize and dramatically limit the size, weight, and power (SWaP) of the overall spacecraft bus. The lack of a propulsion capability for small satellites has created a delay in the development of deep space small spacecraft.

In addition to main propulsion capabilities, propulsion for attitude control may be desirable for deep space satellites and other applications. While conventional reaction wheels are available for small satellites, thrusters would still be needed to de-saturate them, as magnetic methods (e.g., torque rods) may be ineffective outside the Earth's magnetic field. Additionally, these systems add additional mechanical complexity and cost to small satellite systems. Accordingly, there is a lack of a miniaturized propulsion systems capable of performing high Δv maneuvers while also providing high-precision attitude control without complete reliance on reaction wheels.

In view of the above, the inventors have recognized the benefits of staged, ion propulsion thrusters (e.g., electrospray thrusters) and/or ion thrusters with staged ion thruster layers which may provide efficient propulsion capability to explore near Earth objects (NEOs) with small satellites in addition to other possible applications. Such a system may take advantage of a small propellant mass fraction and footprint to deliver compact, high Δv propulsion to small spacecraft for orbital transfers. In working towards this goal, the inventors have recognized the benefits of staging and jettisoning used ion thrusters and/or ion thruster layers after their usable lifetime to reduce the dry mass of the satellite and improve the overall operational lifetime of the propulsion system. Ion thrusters are typically a small overall portion of a spacecraft propulsion system in size and mass and are relatively inexpensive and easy to produce. However, the ion thrusters also typically determine thrust density, specific impulse, efficiency, and system lifetime. Accordingly, by staging and subsequently detaching layers of ion thrusters and/or ion thruster layers, as each layer's operational lifetime is depleted, the individual component and/or system may be jettisoned leading to an improved Δv of the propulsion system without significant added cost or complexity. Thus, the disclosed spacecraft propulsions system may provide high Δv and increased operational lifetimes while reducing the cost of the propulsion system.

In some embodiments, a spacecraft thruster system includes a first ion thruster layer including at least one emitter body and a second ion thruster layer including at least one emitter body. The spacecraft thruster system may also include a propellant source fluidly connected to the first ion thruster layer and the second ion thruster layer, as well as a voltage source that is electrically connected to the first ion thruster layer and the second ion thruster layer. In some embodiments, the first ion thruster layer may be disposed at least partially over the second ion thruster layer and may be selectively detachable from the propellant source and/or voltage source. The voltage source may apply a voltage differential to the first ion thruster layer to emit ions when the first ion thruster layer is connected to the propellant and/or voltage source. When the first ion thruster layer is detached (e.g., following the expiration of the at least one second emitter body operational lifetime), the voltage source may apply a voltage differential to the second ion thruster layer to emit ions from the second ion thruster layer. In instances where the first ion thruster layer is disposed on, or over, the second ion thruster layer, the first ion thruster layer may be detached from the thruster system prior to operation of the second ion thruster layer.

In some embodiments, a spacecraft thruster system includes a first ion thruster including a first ion thruster layer and a first propellant tank, as well as a second ion thruster including a second ion thruster layer and a second propellant tank. The first and second propellant tanks may be fluidly connected to the first ion thruster layer and the second ion thruster layer, respectively, such that each ion thruster has its own separate propellant tank(s) for the associated ion thruster layer(s) included therein. The spacecraft thruster system may also include a voltage source electrically connected to the at least one first ion thruster layer and the at least one second ion thruster layer. The voltage source may apply a voltage differential to the first ion thruster layer to emit ions when the first ion thruster layer is connected to the propellant source and/or voltage source. The first ion thruster layer may be selectively detachable from the voltage source, and the voltage source may apply a voltage differential to the second ion thruster layer to emit ions when the first ion thruster layer is detached from the voltage source. Accordingly, the first and second ion thrusters may share a common voltage source but contain independent propellant sources which allows for simple ejection of exhausted ion thrusters. In some embodiments, at least the first, and in some embodiments, the second ion thruster may be selectively detachable from the overall thruster system.

The above embodiments, may offer a variety of benefits. For example, the disclosed embodiments may allow the ion thruster layers and/or entire ion thruster assemblies to be shed after the associated propellant is exhausted and/or after the useful operational life of a particular thruster is exceeded. Accordingly, the dry mass of the spacecraft propulsion system may be reduced which may result in increased efficiency for the overall system due to the reduced mass combined with the available thrust. Additionally, the disclosed embodiments may increase the overall operational lifetime of the spacecraft thruster system as the use of sequentially activated ion thruster layers may extend the total available operational lifetime of a thruster system.

In some embodiments, a spacecraft thruster system may include a propellant manifold which is configured to supply propellant from one or more propellant sources to one or more thruster layers. The propellant manifold may include a series of pumps, valves, porous materials (e.g. capillary based flow), and/or other components that may be used to supply propellant to multiple ion thruster layers concurrently. In some embodiments, the manifold may be self-sealing such that when an ion thruster, or ion thruster layer, is detached the manifold isolates the propellant disposed within from the external environment. In some embodiments, a voltage source of the thruster system may be electrically connected to the one or more emitter bodies, or arrays of emitter bodies, formed in the various ion thruster layers, through the propellant manifold itself and/or through the propellant itself. Thus, in some embodiments, the manifold may also provide electrical connections from one or more voltage sources to the emitter bodies of the one or more thruster layers. However, electrical connections with the one or more emitter bodies that are separate from the manifold and/or other fluid connection are also contemplated. Additionally, separate electrical connections between the one or more voltage sources and the distal electrodes of the one or more ion thruster layers may also be used as the disclosure is not limited in how the ion thruster layers are connected to the one or more voltage sources.

In some embodiments, an ion thruster layer may include at least one emitter body, and in some embodiments an array of emitter bodies, that are fluidly coupled to a propellant source such as an ionic liquid, room temperature molten salt, and/or any other appropriate propellant. The emitter bodies may have any appropriate construction to permit a propellant to be transported from a base of the emitter body to a distal tip of the emitter body. For example, a porous material, an engineered structure with appropriately thin features formed on its surface, and/or any other appropriate material and/or construction capable of transporting a propellant may be used. Further, depending on the particular embodiment, the propellant may be transported from an associated propellant source towards the distal tip of the one or more emitter bodies through the use of capillary forces and/or pressure. In one such embodiment a pore size gradient may be present along the flow path such that a pore size of the one or more components and/or materials located along the flow path may decrease from the propellant source to the distal tips of the one or more emitter bodies. Therefore, the propellant may be transported from the propellant source to the distal tips of the emitter bodies through capillarity.

In addition to the inclusion of emitter bodies, an ion thruster layer may also include an extractor electrode. A voltage differential may be applied across the extractor electrode and the one or more emitter bodies in order to evaporate and accelerate the ions to generate thrust. In some embodiments, voltage may be supplied to two ion thruster layers concurrently. In cases where one ion thruster layer overlaps or covers another ion thruster layer, it may be desirable to deactivate the covered ion thruster layer. In some embodiments, a lower voltage differential, such as a voltage differential of 0 V, may be applied across the extractor electrode and the one or more emitter bodies of the covered layer to prevent evaporation and/or acceleration of the ions, thereby deactivating the ion thruster layer. For example, a voltage differential may only be applied to the outermost or uncovered ion thruster layer by selectively controlling the voltages applied to the extractor electrodes and/or the emitter bodies of the various ion thruster layers using appropriate electrical switches and/or other structures. In an alternative embodiment, an inverse voltage differential relative to a thrust generating voltage differential may be applied across the extractor and the one or more emitter bodies so that ions are not evaporated and are instead prevented from being emitting from the one or more covered ion thruster layers. Of course, any suitable strategy for deactivating covered ion thruster layers may be employed, as the present disclosure is not so limited.

In some embodiments, ion thrusters and/or ion thruster layers may be linked to a spacecraft or to each other using selectively releasable standoffs. The standoffs may be used to selectively connect and separate adjacent ion thrusters and/or ion thruster layers from one another. Further, these standoffs may be severed mechanically, electrically, chemically, and/or using any suitable method. In some embodiments, the standoffs may be constructed and arranged to detach the ion thruster layers from a propellant source and/or voltage source. According to one exemplary embodiment, a selectively releasable standoff may include a spring and a tensioned wire, where the wire is constructed to melt when a detachment voltage is applied across the wire, though the wire may be severed in any other appropriate way. When it is desired to release an associated ion thruster layer and/or an ion thruster, a voltage may be applied to the wire by a voltage source (e.g., a capacitor, battery, electrical bus, a solar panel, a nuclear battery, and/or any other appropriate power generation and/or distribution system capable of acting as a voltage source) to melt the wire, thereby physically detaching any ion thruster and/or ion thruster layers linked by the standoff. Additionally, this arrangement may sever or otherwise detach an electrical and/or fluid connection between adjacent ion thruster layers and/or ion thrusters with the associated voltage source and/or any propellant sources.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A depicts an embodiment of a spacecraft 10 including staged ion thrusters (e.g., electrospray thrusters) 100. As shown in FIG. 1A, the spacecraft includes a chassis 12 having propulsion and payload mounts 14. The chassis and payload mounts are configured to mount various components to the spacecraft, including power generation systems, sensor packages, and propulsion systems. As shown in FIG. 1A, the chassis is arranged in a rectangular prismatic shape which is simple, easy to manufacture, and may be common in small satellites (e.g., Cubesats), though other shapes and arrangements may also be used. Coupled to the chassis 12 is a power generation system 16, configured in the depicted embodiment as solar panels. The power generation system is electrically connected to a power processing unit 18 which is configured as a main processing unit for the spacecraft. The power processing unit may regulate the power generated by the power generation system and distribute said power to various systems (e.g., the ion thrusters) mounted to the chassis. As shown in FIG. 1A, the power processing unit is mounted to the propulsion system by the payload mounts which may be in close proximity to the ion propulsion thrusters and any optional sensor or communications packages (not shown). According to the embodiment shown in FIG. 1A, the ion thrusters 100 are arranged in six layers each configured as a distinct ion thruster and are staged in a linear array. For example, the first ion thruster 100A is arranged adjacent to and covers the second ion thruster 100B. Each of the ion thrusters includes ion thruster layers 102 which have emitters and extractors configured to emit ions in a desired direction oriented away from the spacecraft when a voltage differential is applied across the associated emitters and extractors of the various ion thruster layers.

According to the embodiment of FIG. 1A, each of the ion thrusters 100A-100C are arranged to be activated sequentially and shed and/or ejected after use. The ion thruster layers of the ion thruster have a predetermined operational lifetime such that the ion thrusters are exhausted or ineffective upon conclusion of the operational lifetime. Accordingly, once the lifetime is reached, the ion thrusters may be jettisoned sequentially after use and the next thruster in the linear array may be activated. For example, when the first ion thruster 100A is spent or exhausted, it may be ejected from the spacecraft and the second ion thruster 100B may be activated. Accordingly, the arrangement shown in FIG. 1A may significantly extend the total amount of operational lifetime of the propulsion system. Additionally, by jettisoning the dry mass of the first ion thruster, the total dry mass of the spacecraft may be reduced so that the later-activated thrusters are more effective at accelerating the spacecraft. The process may be repeated for each subsequently activated thruster so that a high Av for the spacecraft may be achieved. For example, after the second ion thruster 100B is spent it may be jettisoned and the third ion thruster 102C activated to continue providing thrust.

Figure 1B:
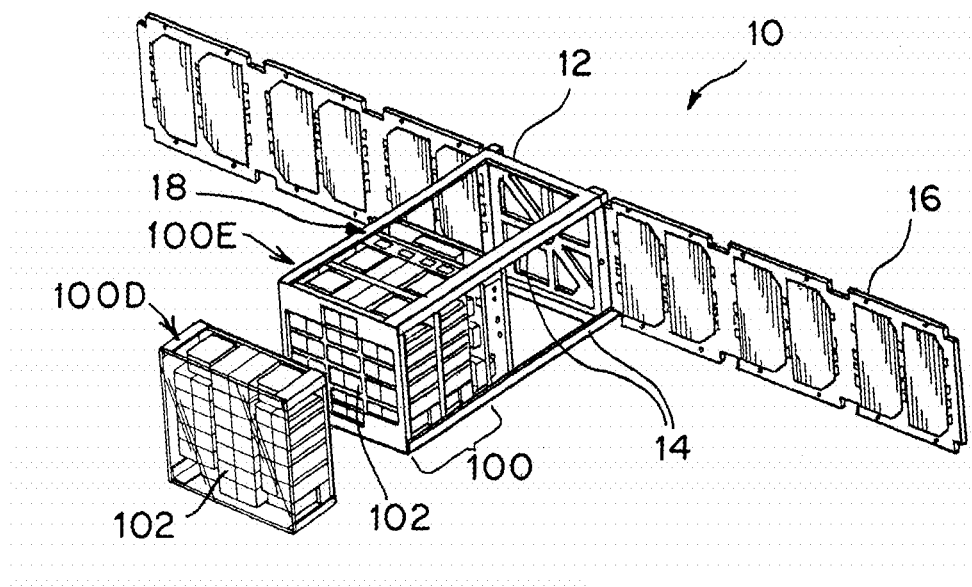
FIG. 1B depicts the spacecraft of FIG. 1A during a stage jettison process.

FIG. 1B depicts the spacecraft 10 of FIG. 1A during a stage jettison process. As shown in FIG. 1B, the first ion thruster, second ion thruster, and third ion thruster (see FIG. 1A) have been previously spent and jettisoned from the spacecraft. The fourth ion thruster 100D has recently completed its operational lifetime and has been physically separated from the fifth ion thruster 100E. Accordingly, the fourth ion thruster has also been electrically detached from the power processing unit 18 and physically detached from the satellite so that it no longer emits ions. Additionally, the separation of the fourth ion thruster 100D has reduced the dry mass of the spacecraft by the mass of the spent fourth ion thruster, so that the fifth ion thruster has a reduced dry mass to accelerate. According to the embodiment shown in FIG. 1B, the ion thrusters may be separated by selectively releasable standoffs.

Figure 2:
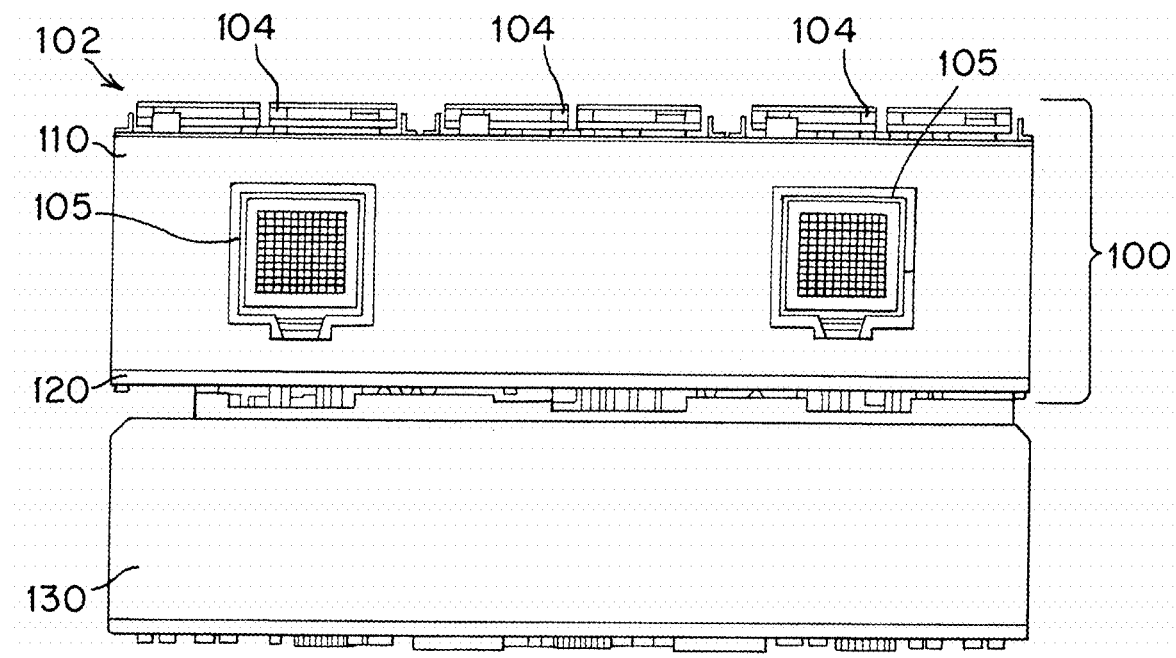
FIG. 2 depicts an embodiment of an electrospray thruster.

FIG. 2 depicts an embodiment of an ion thruster 100. As shown in FIG. 2, the thruster includes emitter bodies 104 disposed in an ion thruster layer 102. The ion thruster layer is disposed on a propellant source 110 which is configured as a tank fluidly connected to each of the emitter bodies. Side-facing emitter bodies 105 may be disposed on a side of the propellant tank 110 and are configured to provide thrust for attitude control. The propellant tank is coupled to a control board 120 which is arranged to selectively apply a voltage differential to the emitter bodies 104 and 105 in the various ion thruster layers to provide thrust in one or more directions. The control board may either separately or collectively regulate the voltage differentials applied to each of the ion thruster layers to control the magnitude and direction of thrust produced by the ion thruster. According to the embodiment of FIG. 2, the ion thruster 100 may be a self-contained unit which is disposable upon exhaustion of the emitter bodies of the ion thruster layers and/or after exhaustion of the propellant contained in the propellant tank. That is, the ion thruster is releasably attached to a power processing unit 130 which is electrically connected to the control board and supplies electrical power which is regulated and controlled by the control board. In cases where more than one ion thruster is used, the power processing unit 130 may be electrically connected to each of the ion thrusters such that a single power processing unit may be shared between each of the ion thrusters.

As described in the various embodiments herein, a power processing unit, power processor, and similar terms may correspond to a system including any appropriate power source and associated electronics capable of providing power to the various ion thruster layers of a propulsion system. Further, in some embodiments, a power processing unit may include one or more processors and associated memory that may correspond to any appropriate non-transitory computer readable medium. Instructions included in the associated memory may be executed by the one or more processors to control operation of the power processing unit, one or more ion thruster layers, and/or other appropriate components of a propulsion system to perform the methods and operations described herein. Further, in some embodiments, control boards, controllers, and other similar terms associated with the ion thruster layers may also include one more processors and associated memory to perform one or more of the described methods and/or operations detailed herein. For example, overall thruster control and staging may be controlled by a power processing unit and subfunctions such as operation of a particular staging system and/or thruster assembly may be controlled at a local level by the appropriate local controller. Of course, while particular control structures are described relative to the various embodiments herein, it should be understood that the current disclosure is not limited to only being controlled in this manner. Accordingly, any appropriate centralized and/or distributed control scheme may be used to implement control of the propulsion systems described herein.

Figure 3A:
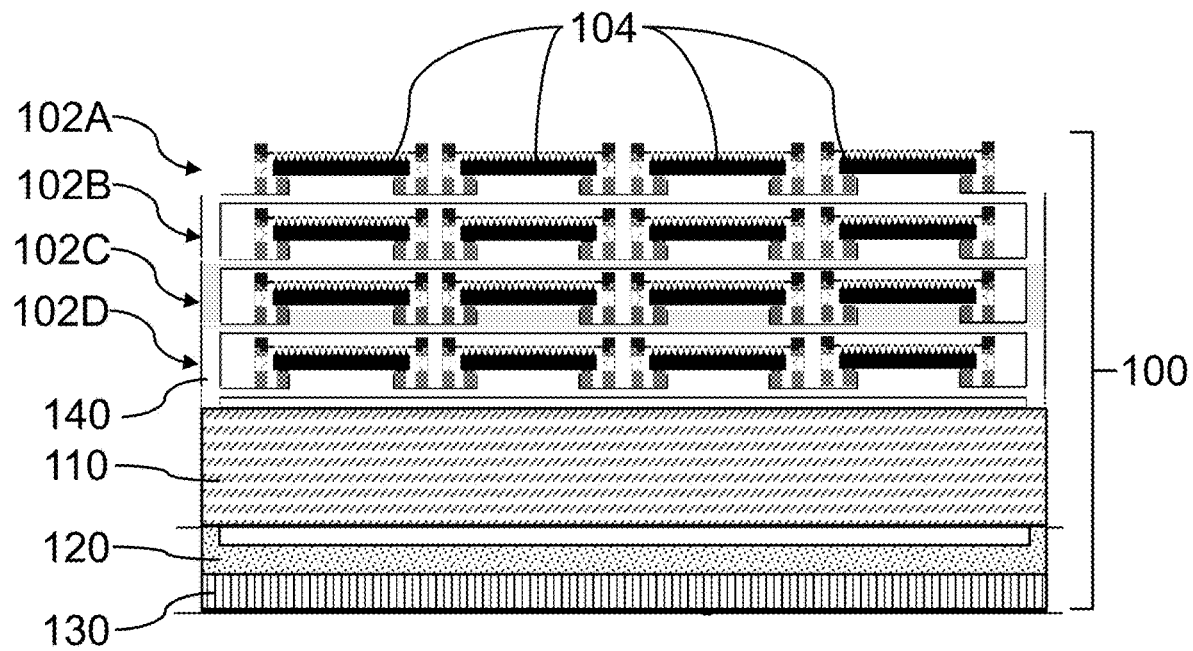
FIG. 3A depicts one embodiment of a staged ion propulsion thruster assembly.

FIG. 3A depicts one embodiment of a staged ion propulsion thruster (e.g., electrospray thruster) 100 including multiple ion thruster layers. As show in FIG. 3A, the thruster 100 includes four ion thruster layers: a first ion thruster layer 102A, a second ion thruster layer 102B, a third ion thruster layer 102C, and a fourth ion thruster layer 102D. The ion thruster layers are stacked one on top of the other in a linear array so that the distal most ion thruster layer is exposed and the proximal, or inner, layers are covered by the immediately distal ion thruster layer. Each ion thruster layer is fluidly connected to a propellant source 110 by a manifold 140 and electrically connected to a power processing unit 130 and control board 120. In some embodiments, the manifold is configured as a propellant manifold and a voltage is applied to the emitter bodies 104 through the propellant contained in the manifold. Thus, the manifold may supply propellant and a voltage to each of the ion thruster layers concurrently from the propellant source and power processing unit/control board respectively. Accordingly, the propellant source, power processing unit, and control board are shared by each of the ion thruster layers. Of course, in some embodiments, each ion thruster layer may include a separate control board, power processing unit, and/or propellant source, as the present disclosure is not so limited.

According to the embodiment of FIG. 3A, each ion thruster layer 102A, 102B, 102C, 102D includes a plurality of emitter bodies 104 each including one or more emitters and an extractor electrode. The propellant source 110 supplies a propellant, such as an ionic liquid or room temperature molten salt, to each of the one or more emitter bodies and the power processing unit 130 and control board 120 applies a voltage potential across the extractor electrode and emitter bodies of the outermost ion thruster layer to evaporate and accelerate ions away from the emitter bodies, thereby generating thrust. The control board 120 is configured to control the application of voltage potential across each of the extractors so that covered ion thruster layers are deactivated. That is, according to the configuration shown in FIG. 3A, the control board may deactivate the second ion thruster layer 102B, the third ion thruster layer 102C, and the fourth ion thruster layer 102D which are disposed beneath the outermost first ion thruster layer.

According to the embodiment of FIG. 3A, the ion thruster layers 102A, 102B, 102C, 102D are sequentially activated and jettisoned to extend the overall operational lifetime of the ion propulsion thruster 100. As discussed previously, the emitter bodies 104 in each ion thruster layer have a predetermined operational lifetime before the emitter body becomes ineffective or inefficient at generating thrust. Accordingly, the amount of propellant in the propellant source 110 may significantly outlast the effectiveness of the emitter bodies. Accordingly, the ion thruster layers are arranged in a linear array and are subsequently activated and jettisoned to fully utilize the available propellant by providing additional operational lifetime relative to a single set of thrusters. For example, the first ion thruster layer 102A may be fully used and subsequently jettisoned, whereupon the second thruster layer may be activated to continue thrust production. In this example, the process would be repeated for the second, third, and fourth stages until all of the ion thruster layers and/or propellant source are exhausted. As discussed previously, the jettisoning of the used ion thruster layers may have the added benefit of reducing the dry mass of the ion thruster so that the later-activated ion thruster layers provide a larger acceleration ($\Delta v$) for the same thrust. Thus, the layered ion thrusters provide a high $\Delta v$ propulsion system with a larger operational lifetime while maintaining low volume by utilizing shared components and a shared propellant tank.

Figure 3B:
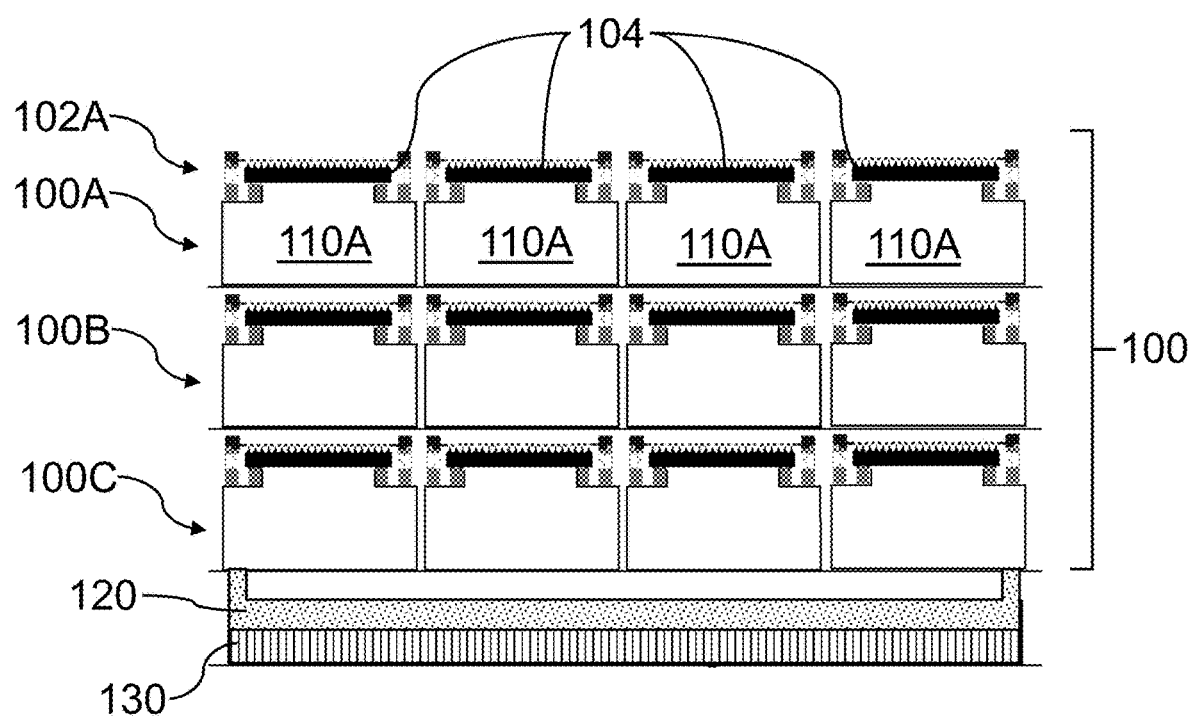
FIG. 3B depicts another embodiment of a staged ion propulsion thruster assembly.

FIG. 3B depicts another embodiment of a staged ion propulsion thruster assembly including multiple ion thrusters 100. As shown in FIG. 3B, each ion thruster 100A, 100B, 100C includes at least one ion thruster layer (e.g., first ion thruster layer 102A) and multiple propellant sources (e.g., first propellant source 110A). The ion thruster layers include a plurality of emitter bodies 104, each of which is fluidly connected to at least one of the propellant sources 110A. According to the embodiment shown in FIG. 3B, each ion thruster layer may be fluidly coupled to a separate propellant tank. Of course, the propellant tanks may be combined or linked so that more than one ion thruster layer may share a propellant tank, as the present disclosure is not so limited. Similar to the embodiment described in FIG. 3A, the ion thruster layers include one or more emitters and an extractor. Each of the thrusters may share a common power processing unit 130 and a control board 120. The power processing unit and control board may control a voltage differential applied to each of the ion thruster layers concurrently. For example, the control board controls which ion thruster layers have a voltage differential applied across a layer, and a magnitude of the voltage differential, so that ions are selectively emitted from one or more ion thrusters to produce a desired thrust. For example, in the depicted thruster, the control board may activate the distal most ion thrusters while deactivating the proximal ion thrusters located beneath the distal most thrusters exposed to the surrounding environment to produce thrust.

According to the embodiment shown in FIG. 3B, the ion thrusters 100A, 100B, 100C are activated and subsequently jettisoned before the next thruster is activated. For example, the first ion thruster 100A may be activated so that first ion thruster layer 102A emits ions and produces thrust until the emitter bodies 104 and/or the associated propellant sources 110A are exhausted. During the jettisoning of an ion thruster, both the ion thruster layer and propellant source(s) of that stage may be ejected from the propulsion system. Accordingly, additional dry mass is ejected between stages as compared to embodiments where multiple ion thruster layers that share a common propellant tank are ejected. Accordingly, such an arrangement may provide greater Δv for a given amount of propellant with a slight increase in overall propulsion system volume due to having multiple tanks.

Figure 4A:
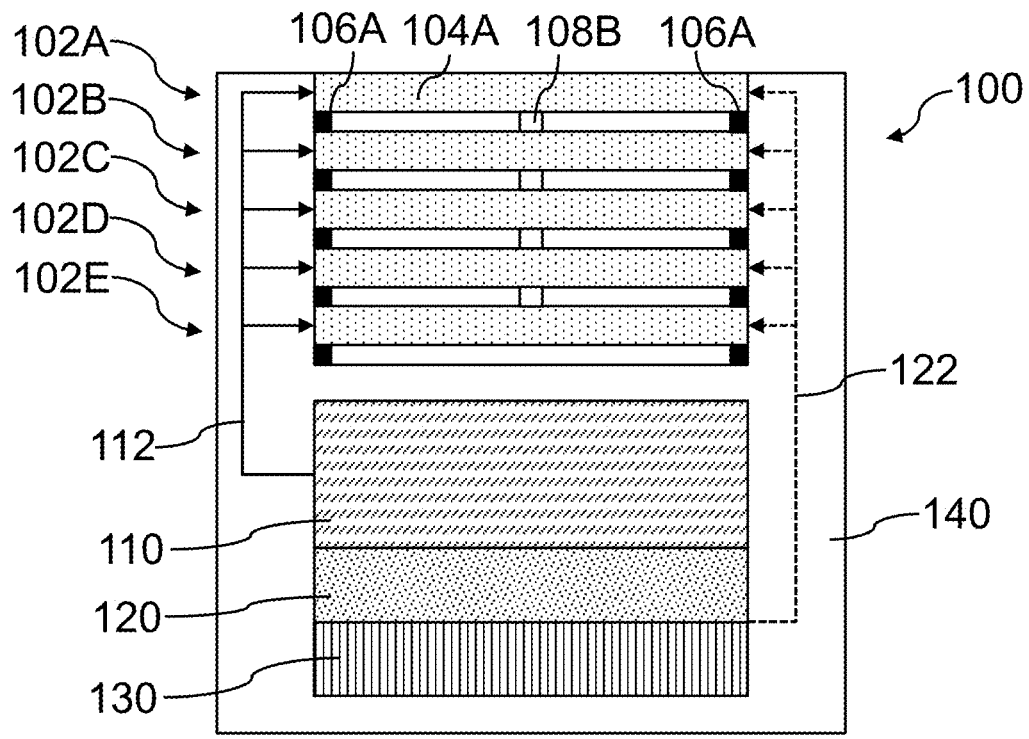
FIG. 4A depicts another embodiment of a staged ion propulsion thruster assembly.

FIG. 4A depicts another embodiment of a staged ion propulsion thruster assembly 100 including multiple ion thruster layers 102A, 102B, 102C, 102D, 102E. Similar to the embodiment of FIG. 3A, each ion thruster layer includes at least one emitter body (e.g., fifth emitter body 104A) which is fluidly connected to a propellant source 110. Each emitter body is also electrically connected to a power processing unit 130 and a control board 120 which are configured to apply a voltage differential to each ion thruster layer. In particular the control board is arranged to apply a voltage differential across an extractor electrode and the at least one, or an array of, emitter bodies formed in the individual ion thruster layers, so that ions may be evaporated and accelerated out of the emitter bodies. The fluid connections 112 and electrical connections 122 to the emitter bodies may be provided by the manifold 140. A separate electrical connection to the individual extractor electrodes may be used, not depicted. Additionally, embodiments in which a separate electrical connection is used to electrically connect the power processing unit and/or control board to the one or more emitter bodies are also contemplated.

As shown in FIG. 4A, each ion thruster layer may include releasable standoffs (e.g., first releasable standoffs 106A) disposed between an ion thruster layer and an adjacent ion thruster layer and/or other underlying structure. The releasable standoffs are configured to physically separate the ion thruster layers once the individual thruster layers have been exhausted. For example, the releasable standoffs may be electrically activated latches which physically detach an ion thruster layer from the thruster assembly 100. During the physical detachment of the ion thruster layer, the ion thruster layer is also electrically and fluidly detached from the power processing unit/control board 130, 120 and the propellant source 110, respectively. Of course, the releasable standoffs may have any suitable arrangement to detach an ion thruster layer and may be operated in any appropriate fashion including a standoff that is mechanically activated, electrically activated, chemically activated, and/or activated in any other appropriate fashion as the present disclosure is not so limited.

According to the embodiment shown in FIG. 4A, each of the ion thruster layers which are proximal to the distal most ion thruster layer (i.e., fifth ion thruster layer 102A) may include a deactivation switch (e.g., second deactivation switch 108B). The deactivation switch is configured to automatically deactivate the ion thruster layers which are disposed proximal to the distal most ion thruster layer. That is, the deactivation switch prevents the emissions of ions by the ion thruster layers which are covered by another ion thruster layer. The deactivation switch may be configured as a push button, single-throw switch, hall-effect switch, micro switch, or any other suitable switching mechanism. The switch may be configured to deactivate the proximal layers by biasing the extractor electrodes of any covered ion thruster layers so that ions are not emitted by those layers. In some embodiments, the switch may bias the voltage differential applied across the extractor and one or more emitters to approximately 0 V so that there is effectively no voltage differential applied across the ion thruster layer. In an alternative embodiment, the switch may inverse the voltage differential relative to a voltage differential used to emit ions (i.e., the voltage differential applied across the extractor and one or more emitters of the distal most ion thruster layer emitter bodies) so that ions are prevented from exiting past the extractor. The switch may be configured to automatically activate the ion thrusters when the ion thruster layer is uncovered and becomes the distal, or outer, most ion thruster layer. In some embodiments, the switch may be an input into the control board 120 and the control board may selectively apply voltage potentials to the individual ion thruster layers. That is, the control board may only apply a voltage differential across distal most ion thruster layer emitter body (e.g., fifth emitter body 104A), and may bias the other ion thruster layers so that ions are not emitted from the covered ion thruster layers. Of course, in some embodiments, the control board 120 may activate the ion thruster layers sequentially or provide any other suitable control methods without a physical switch, as the present disclosure is not so limited.

Figure 4B:
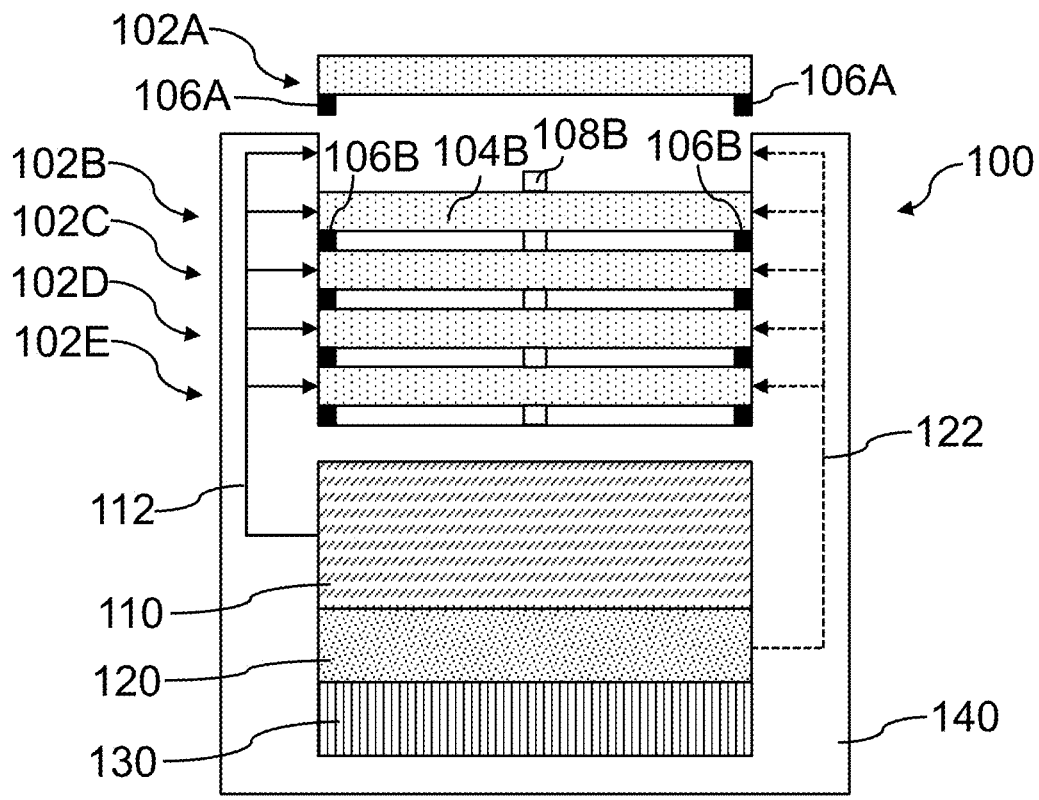
FIG. 4B depicts the staged ion propulsion thruster assembly of FIG. 4A during a stage jettison process.

FIG. 4B depicts the staged ion propulsion thruster assembly of FIG. 4A during a stage jettison process. As shown in FIG. 4B, the first ion thruster layer 102A has been exhausted and was jettisoned by selectively releasing the ion thruster layer by the first releasable standoffs 106A. Accordingly, the first ion thruster layer is physically separate from the thruster assembly 100 and is detached from the propellant source 110 and power processing unit/control 130, 120. Thus, the second ion thruster layer 102B is now the distal most ion thruster layer and may be activated to provide thrust. Second deactivation switch 108B is now no longer activated by the first ion thruster layer, and accordingly the second ion thruster layer may be activated. That is, the deactivation of the second deactivation switch by jettisoning the first ion thruster layer allows the control board 120 to apply a voltage potential to the extractor electrode of the second ion thruster layer so thrust generation can continue. After the second ion thruster layer is exhausted, it will be jettisoned in a similar manner and the third ion thruster layer 102C may be activated to continue thrust generation.

Figure 5A:
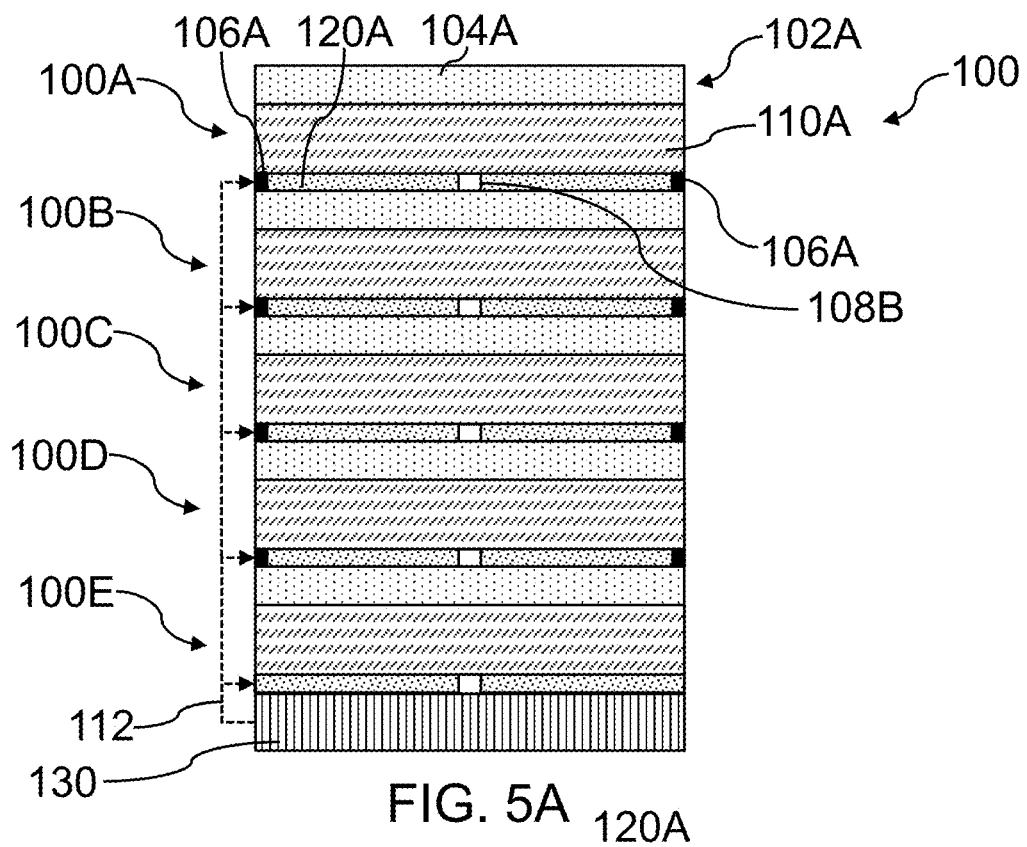
FIG. 5A depicts another embodiment of a staged ion propulsion thruster assembly.

FIG. 5A depicts another embodiment of a staged ion propulsion thruster assembly including multiple independent ion thrusters 100A, 100B, 100C, 100D, 100E. In the embodiment shown in FIG. 5A, the ion thrusters each include an ion thruster layer (e.g., first ion thruster layer 102A) having one or more emitter bodies (e.g., first emitter body 104A), a propellant tank (e.g., first propellant tank 110A), and a control board (e.g., first control board 120A). The ion thruster layer is fluidly connected to the propellant tank which supplies propellant to the emitter body of the ion thruster layer. As discussed previously, each of the emitter bodies includes one or more emitters and an extractor electrode which are arranged to emit ions to generate thrust when a voltage differential is applied. The control boards are electrically connected to a power processing unit 130 via electrical connection 112 as well as the ion thruster layers. Each control board regulates power received from the power processing unit, and controls the voltage differential applied across the one or more emitter bodies and the extractor electrodes of each ion thruster layer. According to the embodiment of FIG. 5A, the control boards are completely isolated from one another, so that each board may control a single ion thruster independently from the control of the other ion thrusters.

As shown in FIG. 5A and similar to the embodiment of FIGS. 4A-4B, each independent ion thruster includes releasable standoffs (e.g., first releasable standoffs 106A) and the ion thrusters located proximally to the distal most outer ion thruster include deactivation switches (e.g., second deactivation switch 108B). The releasable standoffs physically connect the ion thrusters to one another in a linear arrangement. In some embodiments, the releasable standoffs may connect the distinct ion thrusters at the corners and/or periphery of the ion thrusters. However, any suitable position and number of releasable standoffs may be used to couple the ion thrusters, as the present disclosure is not so limited. The releasable standoffs may be selectively releasable to physically separate the distal most ion thruster from the remaining proximal ion thrusters. The deactivation switches may be used as automatic, passive elements which prevent the emission of ions from ion thruster layers which are covered by a connected ion thruster. For example, the deactivation switches may remove or inverse the voltage differential applied across the one or more emitter bodies and the extractor electrode for each proximally located ion thruster. However, instances in which actively controlled switches or other components are used to control the voltage potential applied to the various ion thruster layers are also contemplated.

According to the embodiment of FIG. 5A, each control board (e.g., first control board 120A) may include a releasable electrical connection arranged to make electrical contact with the adjacent ion thruster and transmit electrical power from the voltage source. For example, the control board may include a contact pad which contacts a corresponding contact pad on the next proximal ion thruster so that the ion thrusters are electrically linked through one another to the voltage source. Of course, the voltage source may be electrically connected to the control boards 120 by any suitable arrangement, such as through the releasable standoffs or a manifold, as the present disclosure is not so limited.

Figure 5B:
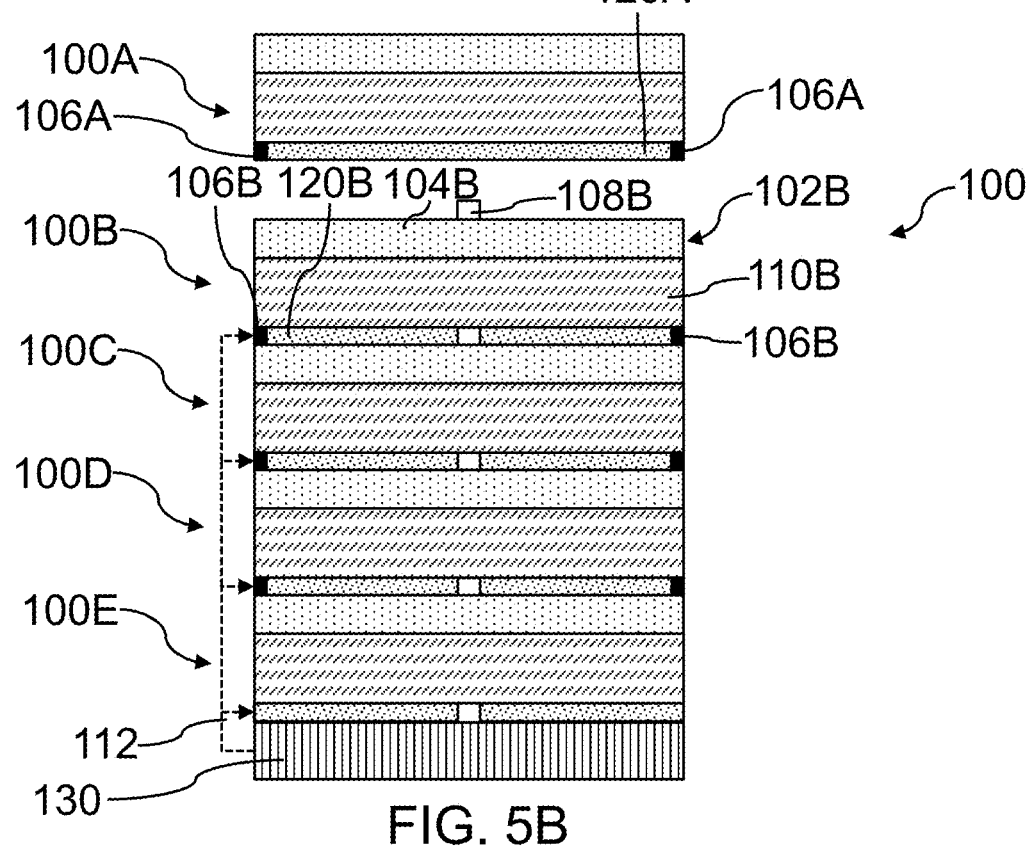
FIG. 5B depicts the staged ion propulsion thruster assembly of FIG. 5A during a stage jettison process.

FIG. 5B depicts the staged ion propulsion thruster assembly of FIG. 5A during a stage jettison process. As shown in FIG. 5B, the first ion thruster 100A has been jettisoned and separated from the second ion thruster 100B. The first releasable standoffs 106A have been released and the electrical connection between the first control board 120A and the voltage source has been severed. Accordingly, the second deactivation switch 108B is no longer depressed by the first ion thruster and the second ion thruster layer 102B may be activated to provide thrust. According to the embodiment shown in FIG. 5B, the thruster generation and jettison process may be repeated for each of the remaining ion thrusters until a final, e.g. the fifth, ion thruster 100E is spent.

Figure 6:
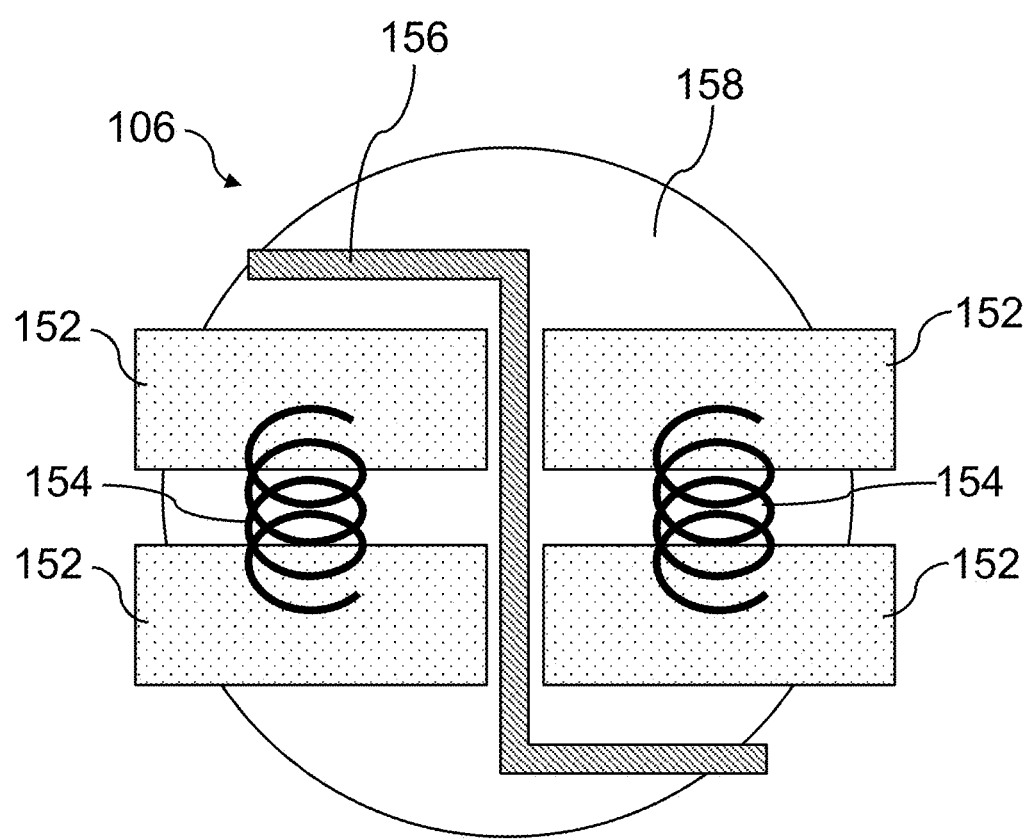
FIG. 6 depicts an embodiment of a stage standoff.

FIG. 6 depicts one embodiment of a releasable standoff 106. According to the embodiment shown in FIG. 6, the standoff includes mounts 152 which are connected to the separate independent ion thrusters or ion thruster layers (i.e., independent stages). Between the opposing mounts are one or more springs 154 which provide an opposing biasing force on the mounts. That is, the springs force the mounts apart so that, barring any resistance, the independent stages are moved apart and physically separated. To counter this opposing biasing force, a tensioned wire 156 is connected to both of the stages and provides a resisting force in the form of tension which prevents separation of the stages. The wire is appropriately constructed though sizing and material selection to be melted upon application of a predetermined voltage and current to the wire, so that the tension holding the independent stages together may be selectively removed. Of course, the wire may also be arranged to be chemically dissolved or weakened, or mechanically separated to separate the independent stages, as the present disclosure is not so limited. In either case, once the wire is severed, the springs may bias the ion thrusters and/or ion thruster layers away from each other to jettison a desired stage from the thruster system. In some embodiments, the spring and tensioned wire standoff may be protected by a volatile organic compound (VOL) 158 which covers and protects the standoff to prevent premature separation during a vehicle launch, for example. The VOL may be dissolved once the spacecraft on which the standoff is disposed is deployed into orbit or otherwise released from a launch vehicle.

EXAMPLES

Without wishing to be bound by theory, as the total v delivered to a spacecraft is a function of the logarithm of the ratio of wet to dry mass of the spacecraft according to Tsiolkovsky's rocket equation, another means of increasing the total v is to reduce the structural mass of the spacecraft by either decreasing the initial dry mass, or by disposing of structural mass that is rendered unnecessary during the mission. According to examples described below, the utility of using a combination of a high specific impulse propulsion system and a staging concept as described in relation to exemplary embodiments herein will be evaluated regarding its potential to perform an orbit raising from an Earth bound geostationary orbit to lunar space, a mission practically out of the reach for Cubesats. While a mission to lunar space was selected in this example, it should be noted that this concept can easily be adapted to a variety of different deep space trajectories, including asteroid encounters, or missions to planetary bodies.

In the present example, the reference mission is based on a 3 U-6 U Cubesat considered for a visit to object 1991 VG. While Cubesats represent the ultimate in small size and affordability, the technology to be developed could be extended to larger platforms in the 50-200 kg range through adequate scaling. There are numerous objects like 1991 VG in the inner solar system, which makes the analysis of this exemplary mission relevant for future potential exploration missions. In particular, 1991 VG's orbital elements (semi-major axis, eccentricity and inclination) differ from Earth's only by $\Delta a=0.027$ AU, $\Delta e=0.033$ and $\Delta i=1.448°$, thus reducing to some extent the velocity change ($\Delta v$) required to reach it. A velocity change of $\Delta v \approx 3.5$ km/s is needed to travel from geostationary orbit (GEO) to near-Earth object (NEO) intercept, with a travel time of about one year and thrust time >2000 hours, depending on power, trajectory and specific mission operations. Most of the travel and thrust time is invested during escape from GEO to a heliocentric orbit. If the exemplary Cubesat were to be deployed by the launcher in an escape trajectory or by a "mothership" near the target, the $\Delta v$ requirements would be lower; however, such high-energy opportunities are less common than rides to GEO or geostationary transfer orbit (GTO). The high $\Delta v$ capability for main propulsion and attitude control achieved by exemplary embodiments described herein are desirable for affordable deep space exploration using small spacecraft.

Given the large number of asteroids in the vicinity of the Earth and the current limited understanding of their intrinsic composition and characteristics, it may be desirable to make use of fleets of small spacecraft to study these objects, thus lowering costs while increasing the frequency of visits and enabling affordable and sustainable NEO exploration and characterization. This understanding is desirable for many reasons, including damage mitigation and identification from potentially hazardous NEO's, while also supporting future crewed and robotic exploration, and in-situ resource utilization missions.

In the present example, a staging mechanism for ion thruster layers (e.g., electrospray thrusters) was designed and implemented using conventional and MEMS micro-manufacturing techniques. The staging of thruster "entities" (i.e., ion thruster layers) was formed by groups of 4 emitter chips and a flow distribution system from a common propellant tank. A single power processing unit (PPU) controlled the voltages to the entities stack for thruster operation and staging of thruster heads. The baseline design for the mechanism consisted of a shape memory alloy (SMA) that extends with heat from an electrical signal, thus separating the entities using compression springs. A volatile organic compound (VOC) protected the mechanism during integration and launch and was removed by sublimation once in space and heat was applied. Several VOCs have been identified for use in this exemplary application (e.g., fluorene) that are non-toxic and do not pose a contamination threat to the rest of the spacecraft when outgassed.

Without wishing to be bound by theory, the performance of the proposed example propulsion system would increase when decreasing the volume and mass of individual components. That is, while existing ion thrusters are already compact (e.g., thruster head height of 2.5 mm), significant miniaturization is still possible. In one proposed example, each entity of a stackable system is limited to not more than 5 mm in thickness. The proposed exemplary thickness of each stackable entity (i.e., ion thruster layer) was applied to the reference mission and is summarized below. In one proposed example, thinner silicon wafers of approximately 1.25 mm thickness were identified as being desirable for the thruster heads.

In the proposed example, the ion thruster chosen was the ion Electrospray Propulsion System (iEPS) developed at MIT's Space Propulsion Laboratory. The main advantages of iEPS over other forms of electric propulsion are its compactness and high performance, especially with relatively low power levels desirable for small satellites. The iEPS propulsion system is also particularly advantageous in cases where high thrust propulsion, with its high propellant mass fractions, cannot be used. Several exemplary iEPS versions have been developed in the past including, but not limited to, the Micro Electrospray Propulsion program and propulsion systems for AeroCube 8 satellites. Both exemplary systems include thruster heads, propellant management systems and power processing units in very compact packages.

Without wishing to be bound by theory, electrospray thrusters make use of the electrostatic acceleration of ions from an ionic liquid, or other type of, propellant to produce thrust. Ionic liquids are typically room temperature molten salts, which are non-toxic and non-reactive. These propellants do not need pressurized containers and rely on passive capillary flow, thus decreasing mass, volume, complexity and cost of the propulsion system. An electrospray emitter consists of a small sharp structure with the conductive propellant flowing towards its apex. A voltage is applied to the liquid with respect to the extractor, generating a strong electric field that triggers ion evaporation and acceleration. The thrust produced by a single emitter is generally very small for practical applications. To circumvent this issue, a large number of emitters may be in two-dimensional arrays, constituting a thruster head or emitter body. Unlike plasma thrusters, electrosprays do not require a volume for gas ionization, and therefore having a small mass and volume footprint compared to the system's power electronics and propellant tanks. In some cases, microfabricated electrospray thruster heads (i.e., emitter bodies) are small, light and may be the least expensive part of the propulsion system. However, they heavily influence the thrust density, specific impulse, efficiency and system lifetime of the ion thruster. For example, in the electrospray thruster system developed during the NASA MEP program, eight thruster heads accounted for 3.2 g compared with the 110 g of the whole propulsion system including tanks and power processing unit. Thus, in this example, the emitter bodies account for less than 3% of the propulsion system by mass and less than 0.05% of the propulsion system by volume. Accordingly, staging of thrusters, or ion thruster layers as described in exemplary embodiments herein, were identified as a solution to extend the lifetime of high $\Delta v$ nanosatellite missions. Additionally, the concept provides increased reliability and resilience of the propulsion system, without substantial increases in system size and mass.

In one identified example, a thin ribbon-like fluid transport ducts may be used as a manifold and are flexible enough and small enough to feed individual thruster heads on each staging entity. These ducts may supply propellant to thruster heads in a substantially identical manner to maintain uniform operational conditions. To retain electric isolation, extractors may be biased to the substrate potential. Alternatively, staged entities may be formed by standalone propellant tanks with attached thruster heads. Such an approach would have a larger structural volume ratio (about 30%), making the propulsion system slightly larger.

In the proposed example, the separation of the staging entities was based on small compression devices that are detached using minimum electric current. There are a variety of elements and strategies that can be used for this purpose (for example, see FIG. 6). In an alternative example, two or more parallel groups of thrusters or thruster layers may be employed and operated sequentially without separation, thereby increasing the firing time without stage jettisoning.

For the exemplary reference mission, the experiments and simulation described herein were based on performance metrics determined for iEPS systems (minimum performance). A 6 U spacecraft bus with an initial wet mass of 9 kg, delivering up to 80 W of power into the iEPS propulsion subsystem was assumed, which could be obtained through deployable solar panels using IMM solar cells with floor efficiency of 25%. It was also assumed the spacecraft is delivered to GEO as a secondary payload. A detailed mission analysis (using STK or NASA's GMAT) provided a precise prediction of the propulsion system requirements. However, a significant fraction of the Δv needed by the reference mission is invested in escaping GEO, from where a variety of similar deep space destinations could be initiated. Table 1 below summarizes the reference exemplary mission implementation requirements for minimum and target performance cases.

TABLE 1

Exemplary reference mission implementation requirements for minimum and target performance cases.

| | Power (W) | Thrust (mN) | $I_{sp}$ (s) | Efficiency | $\Delta v_{esc}$ (m/s) | Escape time (hr) | Δv (m/s) | Total time (hr) | Propellant mass (kg) |
|---|---|---|---|---|---|---|---|---|---|
| Minimum | 11 | 1.3 | 1000 | 0.6 | 2700 | 5280 | 3500 | 6400 | 3 |
| Target | 78 | 4.5 | 2500 | 0.7 | 2568 | 1433 | 3500 | 1900 | 1.25 |

In the proposed exemplary reference mission, the propulsion system consisted of 64 emitter array "chips", addressable in clusters and at least 4 "roll" thrusters. Measurements were performed on these chips, showing they could deliver up to 25 μN of thrust and $I_{sp}$ of about 1000 s. For the minimum performance case, it was assumed each chip would operate at approximately 20 μN (total of 1.3 mN in the longitudinal direction). However, it has been confirmed through recent experimentation that thrust could be increased by at least a factor of 4 through alternative propellant selection and improved materials and manufacturing methods. Specific impulse and efficiency are also expected to increase due to these modifications. Accordingly, in the target performance case, each chip was assumed to produce approximately 70 μN of thrust with $I_{sp}$ of 2500 s.

As discussed previously, a limitation of existing electrospray technology is related to the lifetime of thruster heads (i.e., emitter bodies). As can be seen in the table above, firing times between 2000 hr and up to 6500 hr may be desirable to perform the reference mission. Current electrospray devices have demonstrated laboratory lifetimes of about 500 hr, which is the minimum lifetime performance assumed for the proposed reference mission. It is expected that appropriate modifications to the materials and manufacturing techniques will increase lifetime to a target value of 1000 hr. In order to perform the reference mission, a strategy where groups of thrusters and/or propellant tanks are ejected after used was employed, therefore increasing the effective firing lifetimes to meet the high Δv requirement of the reference mission. For the target case, only 2 stages would be used, whereas for the minimum performance case up to 13 stages would be used. In addition, ADCS algorithms capable of commanding thruster clusters for precise attitude control were employed to eliminate (or complement the utility of) reaction wheels.

At the start of the proposed reference mission, solar panels may be deployed and the first stage of the propulsion system may be activated to increase the orbital altitude of the spacecraft from an assumed geostationary orbit into which it could have been deployed as a secondary ride-sharing payload. In this initial configuration, approximately 2 U are occupied by the stack of propulsion modules and the power processing unit (PPU), which generates and switches adequate high voltages and telemetry signals to these modules. The remaining 1 U of the satellite is available for the rest of the spacecraft, consisting of onboard computer, the communications system, batteries, attitude sensors and a small payload, such as a compact optical camera. As the spacecraft consumes the propellant stored in the first propulsion module, a staging mechanism is activated, ejecting the empty propulsion system and exposing the thrusters located underneath. The PPU then switches to the new propulsion module, and the Cubesat continues to be propelled, depleting the propellant. As the overall mass $M_0$ of the spacecraft decreases both due to decreasing propellant and ejected structural mass, the acceleration of the satellite increases, significantly increasing the v provided per propellant consumed even for constant specific impulse $I_{sp}$, as described by the Tsiolkovsky rocket equation:

$$\Delta v = I_{sp} g_0 \ln\left(\frac{M_0 + m_p}{M_0}\right) \quad (1)$$

Figure 7:
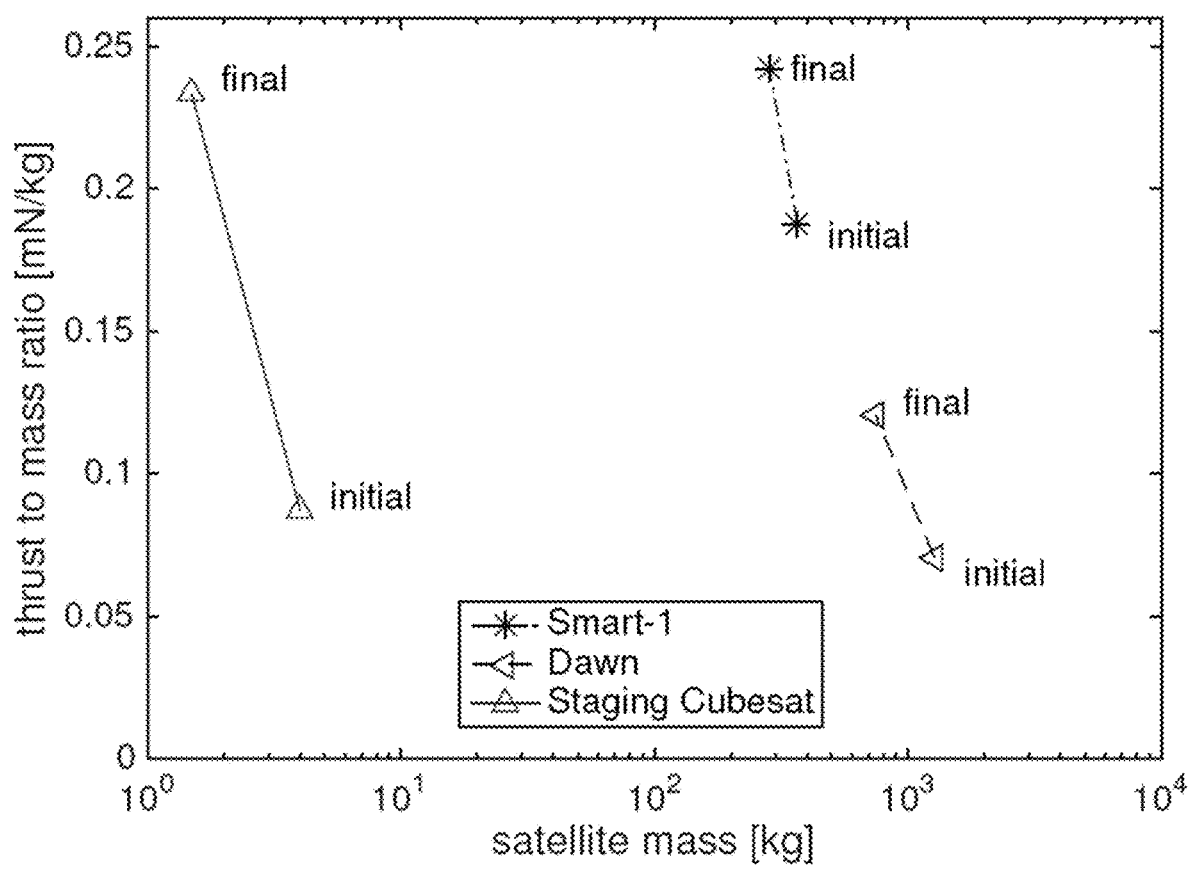
FIG. 7 depicts simulation data of the thrust to mass ratio for an embodiment of a spacecraft powered by a staged electrospray propulsion assembly versus other selected spacecraft.

As the Cubesat mass decreases throughout the reference mission, the power generated by the deployed solar panels can be approximated as constant during the mission, resulting in a Cubesat that is able to perform high thrust maneuvers in the final stages of the mission, compared to Cubesats of its size with body mounted solar cells. By continuously decreasing the spacecraft mass satellite mass by continuously decreasing the spacecraft mass due to staging, the thrust-to-spacecraft-mass increased, allowing for high acceleration maneuvers at final mission stages, compared to the thrust levels required during the transfer period, which can be of special interest when reaching an interplanetary body. In the context of the analyzed moon mission, at beginning of life, the Cubesat already has a high thrust-to-mass ratio comparable to the 1000 kg class Dawn satellite, and could more than double this thrust-to-mass ratio for the final stages of the mission, surpassing even the ESA Smart-1 satellite. FIG. 7 depicts simulation data of the thrust to mass ratio for an embodiment of a spacecraft powered by staged electrospray propulsion assembly versus other selected spacecraft, such as the ESA Smart-1 satellite.

The current analysis was not optimized for an ideal number of stages, but was based on the maximum number of stages of the assumed thruster design available to fit into a 3 U Cubesat, allowing 1 U for bus and payload. It should be noted that embodiments disclosed herein, may be optimized for the type of staging (staging emitter arrays reusing a tank structure, versus staging entire emitter-tank assemblies), as well as optimization for the number of stages based on specific mission requirements.

For this completed analysis, the specific impulse was defined as $I_{sp}=F/\dot{m}g$, where F is the engine thrust, $\dot{m}$ is the propellant mass flow rate and $g=9.8$ m/s². The $I_{sp}$ of chemical systems could be as low as 80 s for cold gas thrusters or as high as 250 s for (hydrazine) monopropellant thrusters and up to about 400 s for much more complex bipropellant thrusters ($H_2$, $O_2$). The $I_{sp}$ for electric propulsion can be much higher, typically in the range from 1000 to 2500 s, or more. For the reference mission with a $\Delta v$ of about 3.5 km/s, the propellant mass fractions (with respect to the initial mass) were:

| Propellant mass fractions for $\Delta v = 3.5$ km/s | Cold gas propulsion $I_{sp} = 80$ s | Chemical monopropellant $I_{sp} = 250$ s | Chemical bipropellant $I_{sp} = 400$ s | Electric propulsion $I_{sp} = 1000$ s | Electric propulsion $I_{sp} = 2500$ s |
|---|---|---|---|---|---|
| $\frac{m_p}{m_0} = 1 - e^{-\frac{\Delta v}{gI_{sp}}}$ | 99% | 76% | 59% | 30% | 13% |

The properties of the proposed propulsion system applied to the reference mission were:

| | Propellant mass (kg) | Total time (hr) | Number of entities | Entity stack height (cm) | Entity stack mass (g) | Tank height (cm) | Propulsion system size (U) |
|---|---|---|---|---|---|---|---|
| Minimum | 3 | 6400 | 13 | 6.5 | 665 | 7.5 | 3.4 |
| Target | 1.25 | 1900 | 2 | 0.5 | 51 | 5.5 | 1.8 |

It was assumed the ionic liquid propellant has a density of 1.5 g/cc (typical value), a propellant tank structural volume ratio of 20%, mass per chip including flow system of 0.8 g (minimum) and 0.4 g (target), and a PPU height of 3 cm, consistent with existing hardware. Even in the minimum performance case, the propulsion system of exemplary embodiments describe herein would allow the 6 U Cubesat to bring a scientific payload, such as a compact imaging system, to the NEO in this exemplary reference mission.

In some cases, a suitable approach of modeling a transfer from an initial Earth-centered orbit to a lunar or Selenocentric orbit using low-thrust propulsion is to divide the trajectory into two phases. The first phase consists of transferring from the initial orbit to a position inside of the Moon's sphere of influence (SoI). When the spacecraft reaches the SoI, it will thrust until it reaches the desired Selenocentric orbit. For this reference mission, the dynamical system was modeled considering only the influence of gravity of the Earth and the Moon. Perturbations such as the $J_2$ effect, solar radiation or atmospheric effects were not considered. Furthermore, the system was assumed to be two-dimensional with the Moon's orbit about the Earth circular. The thrust produced by the engine was included, acting as the means for the spacecraft to modify its orbit.

The first phase of the reference mission consisted of transferring the spacecraft from a Geostationary orbit (GEO) to a position inside the Moon's SoI. The dynamical system was defined in an Earth-centered rotating reference frame, with the rotation rate equal to the Moon's angular velocity. The system in spherical coordinates was defined in the following fashion:

$$\dot{v}_r = -\left(\frac{\mu - rv_\theta^2}{r^2}\right) - \mu_M\left(\frac{r + r_M \cos\theta}{D^3}\right) + \frac{\mu_M \cos\theta}{r_M^2} + 2\omega v_\theta + \omega^2 r + \frac{T}{m}\sin\alpha \quad (2)$$

$$\dot{v}_\theta = -\frac{v_r v_\theta}{r} + \frac{\mu_M r_M \sin\theta}{D^3} - \frac{\mu_M \sin\theta}{r_M^2} - 2\omega v_r + \frac{T}{m}\cos\alpha \quad (3)$$

$$\dot{r} = v_r \quad (4)$$

$$\dot{\theta} = \frac{v_\theta}{r} \quad (5)$$

where $v_r$ is the spacecraft's radial velocity, $v_\Theta$ is its angular velocity, r is the radius of its orbit and is its angular position.

The gravitational parameter of the Earth was defined as $\mu$, while the lunar one is defined as $\mu_M$. The angular velocity of the Moon with respect to the Earth (assuming Earth is the focus in the reference system) was defined as $\omega$, while the radius of the Moon's orbit is represented by $r_M$. Furthermore, the mass of the spacecraft was defined as m, while the thrust produced by the engine was defined as T. The thrust direction, was defined as the angle from the local horizon, and is represented by $\alpha$. The distance from the spacecraft to the Moon is derived from the cosine rule and was defined mathematically as:

$$D^2 = r^2 + r_M^2 + 2rr_M \cos\theta \quad (6)$$

Additionally, the state vector includes the rate of change of the mass of the spacecraft:

$$\dot{m} = -\frac{T}{I_{sp}g_0} \quad (7)$$

Where the thrust was defined mathematically as:

$$T = \frac{2\eta P}{I_{sp}g_0} \quad (8)$$

In the last expression, $\eta$ if the thruster efficiency, P is its power, $I_{sp}$ is its specific impulse and $g_0$ is the acceleration due to Earth's gravity.

For the second phase, where the spacecraft is in a Selenocentric orbit, the reference frame is rotational Lunar centered with the rotation rate equal to the Earth's angular velocity with respect to the Moon. This was defined mathematically as:

$$\dot{v}_{r_L} = -\left(\frac{\mu_M - r_L v_{\theta_L}^2}{r_L^2}\right) - \qquad (9)$$

$$\mu\left(\frac{r_L + r_M \cos\theta_L}{D_E^3}\right) + \frac{\mu\cos\theta_L}{r_M^2} + 2\omega v_{\theta_L} + \omega^2 r + \frac{T}{m}\sin\alpha$$

$$\dot{v}_{\theta_L} = -\frac{v_{r_L}v_{\theta_L}}{r_L} + \frac{\mu r_M \sin\theta_L}{D_E^3} - \frac{\mu\sin\theta_L}{r_M^2} - 2\omega v_{r_L} + \frac{T}{m}\cos\alpha \qquad (10)$$

$$\dot{r}_L = v_{r_L} \qquad (11)$$

$$\dot{\theta}_L = \frac{v_{\theta_L}}{r_L} \qquad (12)$$

where $v_{r_L}$ is the spacecraft's radial velocity, $v_{\Theta_L}$ is its angular velocity, $r_L$ is the radius of its orbit and $\Theta_L$ is its angular position in the Selenocentric reference frame. The distance from the spacecraft to the Earth is represented by $D_E$.

An original optimization approach was used to analyze the spacecraft in the reference mission, consisting of searching for a stable lunar orbit at the end of the first phase of the transfer. The method consisted of starting in a GEO orbit and thrusting in the same direction as the velocity vector for a determined time, represented by $t_{f1}$. This resulted in the greatest rate of increase in the semi-major axis of the spacecraft and was defined mathematically as:

$$\cos\alpha = \frac{v_\theta}{v} \qquad (13)$$

$$\sin\alpha = \frac{v_r}{v} \qquad (14)$$

Additionally, the initial angular position of the spacecraft, $\Theta_0$, was defined, which will allow the spacecraft to position itself very close to the Moon by $t_{f1}$, resulting in a stable Selenocentric orbit. The stability of the orbit may be monitored by spacecraft's semi-major axis and eccentricity with respect to the Moon at $t_{f1}$, represented by $a_L$ and $e_L$, respectively. The resulting function to minimize, J, was defined as:

$$J(t_{f1} \cdot \theta_0) = W_{e_L}|e_L(t_1)| + W_{a_L}\left|\frac{a_L(t_1)}{R_{SOI}}\right| \qquad (15)$$

In this expression, the design parameters are $t_{f1}$ and $\Theta_0$, while the parameters to minimize are $a_L$ and $e_L$ at the end of the first phase. With this optimization, a mission designer may strive to find a circular orbit within the SoI of the Moon. It can be observed that $a_L$ is divided by the value of the Lunar SoI so that the parameters to minimize are similar in value. The weights $W_{a_L}$ and $W_{e_L}$ are used by the mission designer depending on the orbit desired at the end of the first phase. Furthermore, the optimization problem has the following constraints:

$$|e_L(t_1)| < 1 \qquad (16)$$

$$\left|\frac{a_L(t_1)}{R_{SOI}}\right| < 1 \qquad (17)$$

With the expressions described above, the trajectories outside of the SoI which are not circular nor eccentric were not considered. The cost function J was minimized using a Differential Evolution algorithm from the PyGMO toolbox created by the Advanced Concepts Team of the European Space Agency.

For the second phase of the transfer in the exemplary reference mission, the spacecraft thrust is oriented in the direction opposite to the velocity vector to create the greatest rate of decrease in the semi-major axis (Selenocentric reference frame) until it impacts the surface of the Moon. This is a similar approach as the SMART-1 mission, which resulted in various revolutions in lunar orbit, allowing a greater coverage time of the Moon to acquire scientific data.

The dynamical system of equations for both mission phases described previously and the optimization method where incorporated in the Python environment to simulate the difference in performance between a spacecraft with a Fixed Structural Mass (FSM) and one that used the staging mechanism of exemplary embodiments described herein. The parameters used for the simulations are defined in Table 2 below.

TABLE 2

Simulation parameters used to analyze a conventional propulsion system and a staged propulsion system of exemplary embodiments described herein.

| Thruster specifications | |
|---|---|
| Thruster Efficiency (%) | 60 |
| Total Efficiency (%) | 50 |
| Specific Impulse (s) | 2500 |
| FSM Spacecraft | |
| Cubesat type | 3U |
| Spacecraft mass (kg) | 5.0 |
| Propellant mass (kg) | 0.6 |
| Staging Spacecraft | |
| Cubesat type | 3U |
| Spacecraft mass (kg) | 5.0 |
| Number of stages | 6 |
| Stage mass (kg) | 0.5 |
| Propellant mass/stage (kg) | 0.1 |
| Initial Earth-centered orbit | |
| a (km) | 42,165 |
| e | 0.0 |
| i, Ω, ω (deg) | 0.0 |
| Propagation/Optimization | |
| $\theta_M$ (deg) | 0.0 |
| $H_1$ (days) | 1.20 |
| $H_2$ (s) | 50.0 |
| $W_{a_L}$ | 1.5 |
| $W_{e_L}$ | 1.0 |

From Table 2, it can be observed that both Cubesats were 3 U and had the same initial wet and propellant mass. The main difference is that the staging spacecraft had six stages with a wet mass of 0.6 kg each, composed of the structural mass of the stage (0.5 kg) and the propellant mass for each stage (0.1 kg). The simulation starts from GEO, assumed to be a circular two-dimensional orbit with an altitude of 42,165 km as discussed above. The initial angular position of the Moon with respect to the Earth in an inertial geocentric reference frame is defined as $\Theta_M=0°$. The step size defined for the first phase ($H_1$) was 1.2 days while for the second one ($H_2$) was 50 seconds. The change was due to the sensibility required during the first integration steps of the second phase. If the step size is too high, a stable Selenocentric orbit may not be possible even if the initial conditions are correct, due to the large gravitational Earth effects experienced by the spacecraft at that time. The magnitude of the weights of the cost function were set to ensure capture of the spacecraft by the Moon.

Table 3 below presents a comparison of the performance for the first phase of the transfer for both spacecraft. The main observation was that both the time of flight and propellant consumption of the transfer was reduced by 12.7% when using the staging mechanism, displaying the advantage of the staged system. The percent reduction is the same for both parameters since the propellant consumption is directly proportional to the time of flight because the engine is operating continuously during the flight. The final orbital parameters in the Earth-centered reference frame are similar in terms of semi-major axis and eccentricity, as well as the final orbital parameters in the Selenocentric reference frame, but the difference observed does result in very different trajectories for the second phase.

TABLE 3

First Phase: GEO to Selenocentric orbit (results for FSM and staging Cubesat)

|  | Fixed Mass | Staging |
| --- | --- | --- |
| $t_{f1}$ (days) | 394.30 | 344.25 |
| $m_1(t_{f1})$ (kg) | 4.613 | 3.162 |
| $m_{P1}(t_{f1})$ (kg) | 0.387 | 0.338 |
| $a(t_{f1})$ (km) | 261,537 | 292,871 |
| $e(t_{f1})$ | 0.409 | 0.366 |
| $a_L(t_{f1})$ (km) | 30,634 | 26,007 |
| $e_L(t_{f1})$ | 0.259 | 0.210 |

Table 4 below presents the results for the second phase of the reference mission. It is seen that the difference in initial conditions between the two cases analyzed provide very different trajectories even though the same control law is used. This is mainly due to the difference in initial mass of the spacecraft for the second phase, which was a 31% reduction from the FSM to the staging spacecraft. The time of flight is almost half between the two cases, both impacting lunar surface at the end of the phase, with the staging spacecraft ending in a much higher eccentricity orbit when compared to the FSM case.

TABLE 4

Second Phase: Selenocentric orbit to impact on Lunar surface (results for FSM and staging Cubesat).

|  | Fixed Mass | Staging |
| --- | --- | --- |
| $t_{f2}$ (days) | 151.55 | 74.57 |
| $m_1(t_{f2})$ (kg) | 4.464 | 2.588 |
| $m_{P2}(t_{f2})$ (kg) | 0.536 | 0.412 |
| $r_L(t_{f2})$ (km) | 1,738.833 | 1745.057 |
| $a_L(t_{f2})$ (km) | 3,858.325 | 6,208.963 |
| $e_L(t_{f2})$ | 0.550 | 0.724 |

Figure 8A:
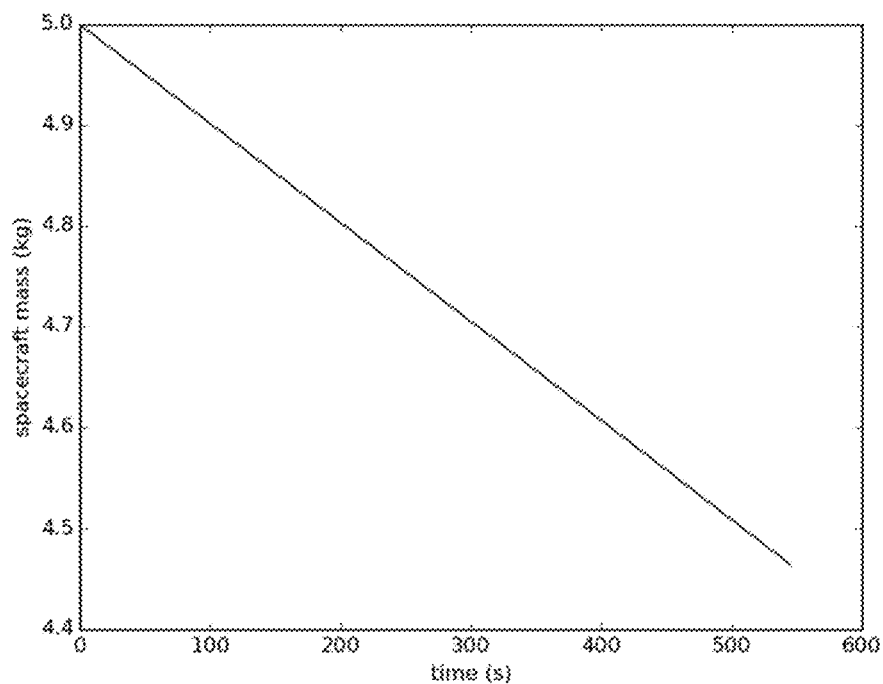
FIG. 8A depicts simulation data of the mass of a conventional ion propulsion spacecraft versus time.
Figure 8B:
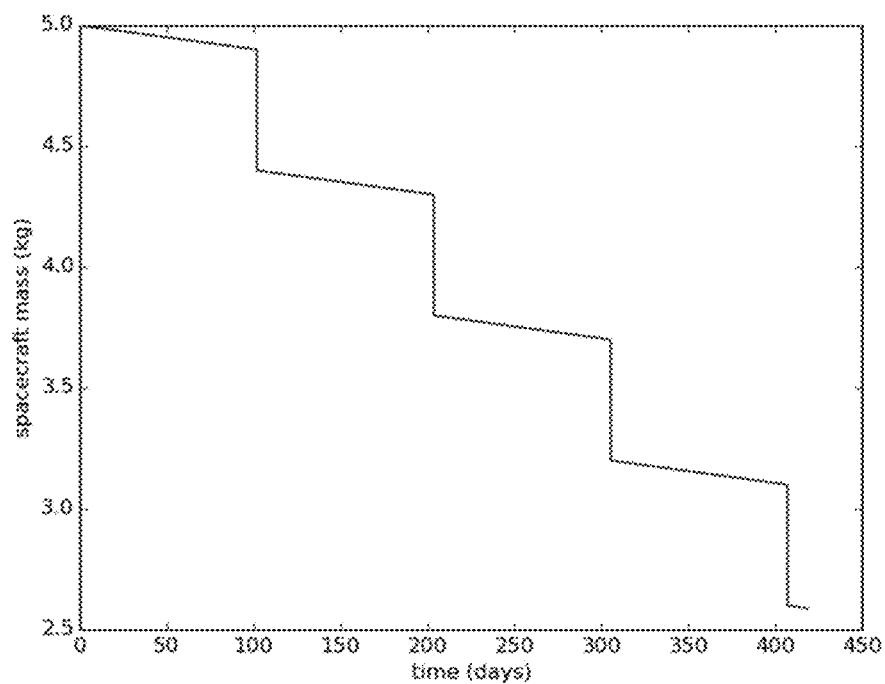
FIG. 8B depicts simulation data of the mass of an embodiment of a spacecraft powered by staged electrospray propulsion assembly versus time.

FIGS. 8A-8B depict simulation data of the mass over time of the simulated fixed spacecraft mass (FSM) and an embodiment of a spacecraft powered by staged electrospray propulsion assembly. For the FSM case in FIG. 8A, the mass changed at a constant rate since the thrust and specific impulse of the engine throughout the trajectory remain constant. For the staging case, there is a similarity to a step function since the spacecraft immediately loses 0.5 kg of mass once the 100 g of propellant of each stage is spent and the stage is released. For the first phase of the staging case, three stages are spent, while the second phase only experiences one spent stage.

While no optimization regarding the type of staging (staging of entire tanks systems, or staging of emitter arrays using a shared tank) was performed, these simulation results demonstrate the feasibility of increasing the capability of a Cubesat mission by staging entire electric propulsion thruster units, based on conventional micro-machined electrospray thrusters. These simulation results show that even using a sub-optimal approach can significantly push the boundary for propulsion in small satellites, suggesting that actively reaching the moon can be achieved with a satellite that is less than 5 kg, a feat currently reserved for large spacecraft. The analysis performed confirmed the positive impact of such a staging concept on mission duration, compared to a traditional approach by significantly reducing overall mission duration. In addition, this approach would lead to an increase of total impulse beyond the capability of individual thrusters, in the same way as it increases the maximum system lifetime beyond the lifetime of individual thruster components, resulting in increased robustness against premature, or unexpected, failures.

In some embodiments, the ion thrusters described herein may employ micro-machined electrospray propulsion systems, such as those developed at the Space Propulsion Laboratory of the Massachusetts Institute of Technology. These electrospray thrusters use an electrostatic acceleration principle, in which the charged particles are extracted directly from the surface of an ionic liquid by applying a potential difference between the liquid and a counter electrode. To achieve a suitable field strength, the liquid flows into a sharp emitter structure, leading to particle emission from the apex of the tip. The extracted particles are then accelerated by the same potential difference. To increase the emission current and resulting thrust, emitter arrays with 480 emitters per square centimeter have been developed, resulting in a thrust of 12N per emitter array at an emission current of 150 A. The propellant is fed by capillary forces from the propellant tank to the porous emitter array. Multiple emitter arrays can be grouped together, sharing a common propellant reservoir (for example, see FIG. 2) depicting a thruster consisting of three emitter arrays mounted to a shared propellant tank.

In some embodiments, a specific impulse of 2500 s may be a realistic baseline for this type of electrospray thruster, based on experimental results with single emitter ion sources. While recent characterization efforts of array type emitters have demonstrated specific impulse of such arrays of 760 s, a number of possible measures have been identified, that can be implemented in future devices to increase the specific impulse. These modifications include the reduction of droplet emission by adjusting the microscopic features of the porous emitter substrate and reducing the angular misalignment of the individual emission sites by improved emitter tip shaping. The nature of the ionic liquid propellant allows for extraction of both positively and negatively charged particles, and low frequency alternation of the emission potential has been successfully used to maintain electrochemical stability in the tank, allowing for complete propellant exhaustion. In some embodiments, thrusters of different emission polarity may be paired to prevent or inhibit spacecraft potential drift, mitigating the need for an external neutralizer, typically used for other electric propulsion systems.

Many small satellite missions with high Δv requirements may benefit from the capabilities associated with the exemplary embodiments described herein. These include scientific and exploration missions of interest to NASA, such as long term free flyers (i.e., continuous drag compensation in LEO), lunar or planetary exploration and distributed propulsion for large scale observatories, including long-term formation flight of coronagraphs and space telescopes. Other users could include diverse agencies of the DoD for such missions like deploying small satellites from LEO to MEO/GEO, reconfiguration of space assets, etc., and private sector users interested in space mining, space debris mitigation and the deployment and long term maintenance of constellations of small satellites for imaging and communications applications. Of course, the stage electrospray thruster of exemplary embodiments described herein may be deployed for any suitable mission on any spacecraft, as the present disclosure is not so limited.

One embodiment of an exemplary spacecraft thruster system was experimentally demonstrated to show ion thrusters sharing a common controller. The spacecraft thruster system included two stages of electrospray thrusters. A power processing unit was configured to control both electrospray thrusters, and control signals were passively routed to the correct electrospray thruster during operation. The electrospray thruster stages were coupled together with two staging mechanisms including stainless steel wires that resisted a separation force applied between the stages from a compression spring disposed between the stages similar to the device described relative to FIG. 6. A capacitor was charged and stored energy for later resistive melting of the steel wire. During testing, the first stage electrospray thrusters were fired. Next, the first stage thrusters were ejected by discharging the capacitor through the stainless steel wires to heat them to their melting point, whereupon the wires were severed permitting the springs to extend and eject the first stage from the system. After the ejection of the first stage, control signals were passively routed to the second stage, whereupon the second stage successfully fired. Thus, the thruster system successfully controlled operation and staging, i.e. selective ejection, of the staged thrusters.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A spacecraft thruster system comprising:
    a first ion thruster including a first ion thruster layer and a first propellant tank fluidly connected to the first ion thruster layer;
    a second ion thruster including a second ion thruster layer and a second propellant tank fluidly connected to the second ion thruster layer;
    a deactivation switch disposed between the first ion thruster and the second ion thruster; and
    a voltage source electrically connected to the first ion thruster and the second ion thruster, wherein at least the first ion thruster layer is selectively disconnectable from the voltage source, wherein the voltage source applies a voltage differential to the first ion thruster layer to emit ions when the first ion thruster layer is electrically connected to the voltage source, wherein the deactivation switch is configured to be depressed when the first ion thruster is electrically connected to the voltage source, and wherein the deactivation switch is configured to allow the voltage source to apply the voltage differential to the second ion thruster layer to emit the ions when the first ion thruster layer is disconnected from the voltage source.

2. The spacecraft thruster system of claim 1, wherein each of the first ion thruster layer and the second ion thruster layer comprises a respective extractor electrode and a respective one or more emitter bodies, wherein each of the first ion thruster layer and the second ion thruster layer emits the ions when the voltage differential is applied across the respective extractor electrode and the respective one or more emitter bodies.

3. The spacecraft thruster system of claim 1, wherein the first ion thruster is connected to the second ion thruster by one or more releasable standoffs.

4. The spacecraft thruster system of claim 3, wherein the one or more releasable standoffs comprise a spring and a tensioned wire, wherein the tensioned wire is configured to melt when a detachment voltage is applied across the tensioned wire, and wherein the one or more releasable standoffs physically separates when the tensioned wire is melted.

5. A method for operating a spacecraft thruster system, comprising:
    firing a first ion thruster, wherein firing the first ion thruster includes:
        supplying a first propellant to a first ion thruster layer from a first propellant source of the first ion thruster, and
        applying a voltage differential to the first ion thruster layer to from a voltage source electrically connected to the first ion thruster layer to emit first ions;
    ejecting the first ion thruster;
    releasing an activation switch disposed between the first ion thruster and a second ion thruster when the first ion thruster is ejected; and
    firing the second ion thruster, wherein firing the second ion thruster includes:
        supplying a second propellant to a second ion thruster layer from a second propellant source of the second ion thruster, and
        applying the voltage differential to the second ion thruster layer from the voltage source when the activation switch is released to emit second ions, wherein the voltage source is electrically connected to the second ion thruster layer.

6. The method of claim 5, further comprising deactivating the second ion thruster layer when the first ion thruster layer is electrically connected to the voltage source.

7. The method of claim 5, wherein ejecting the first ion thruster comprises:
    melting a tensioned wire coupling the first ion thruster to the second ion thruster; and
    electrically disconnecting the first ion thruster layer from the voltage source.

8. The method of claim 7, wherein ejecting the first ion thruster further comprises separating the first ion thruster from the second ion thruster with a compression spring.

* * * * *